United States Patent
Yamazaki et al.

(10) Patent No.: US 11,260,901 B2
(45) Date of Patent: Mar. 1, 2022

(54) SELECTIVE BRAKING OF FOUR WHEEL STEERING VEHICLE

(71) Applicant: HONDA MOTOR CO., LTD., Tokyo (JP)

(72) Inventors: Ryosuke Yamazaki, Wako (JP); Takumi Inagaki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 275 days.

(21) Appl. No.: 16/572,987

(22) Filed: Sep. 17, 2019

(65) Prior Publication Data
US 2020/0102004 A1    Apr. 2, 2020

(30) Foreign Application Priority Data

Sep. 27, 2018  (JP) .............................. JP2018-181419

(51) Int. Cl.
| | |
|---|---|
| B62D 6/00 | (2006.01) |
| B62D 7/14 | (2006.01) |
| B62D 15/02 | (2006.01) |
| B60T 8/172 | (2006.01) |
| B60W 10/184 | (2012.01) |
| B60W 10/20 | (2006.01) |
| B60W 40/068 | (2012.01) |
| B60T 8/24 | (2006.01) |

(52) U.S. Cl.
CPC .............. *B62D 6/00* (2013.01); *B60T 8/172* (2013.01); *B60T 8/245* (2013.01); *B60W 10/184* (2013.01); *B60W 10/20* (2013.01); *B60W 40/068* (2013.01); *B62D 7/14* (2013.01); *B62D 15/021* (2013.01); *B60W 2510/202* (2013.01); *B60W 2520/16* (2013.01); *B60W 2540/18* (2013.01); *B60W 2552/40* (2020.02); *B60W 2710/18* (2013.01); *B60W 2710/20* (2013.01)

(58) Field of Classification Search
None
See application file for complete search history.

(56) References Cited

U.S. PATENT DOCUMENTS

2017/0274877 A1*  9/2017  Wou ...................... B60T 8/1766

FOREIGN PATENT DOCUMENTS

| JP | H01101979 U | | 7/1989 | |
|---|---|---|---|---|
| JP | 2002347600 A | * | 12/2002 | |
| JP | 2014015082 A | * | 1/2014 | |
| WO | WO-2015082971 A | * | 6/2015 | ........... B62D 5/0496 |

* cited by examiner

*Primary Examiner* — Christian Chace
*Assistant Examiner* — Katherine Marie Fitzharris
(74) *Attorney, Agent, or Firm* — Armstrong Teasdale LLP

(57) ABSTRACT

A four wheel steering vehicle (1), in which front wheels (2f) and rear wheels (2r) can be steered in response to a steering input from a steering wheel (11), includes a rear wheel steering control unit (50) that variably controls a rear wheel steering device such that the rear wheels are steered in a prescribed relation to a steered angle of the front wheels. When the steering input is determined while the front wheel brake and the rear wheel brake are engaged, the rear wheel steering control unit disengages the rear wheel brake and steers the rear wheels. When the fore and aft inclination angle detected by an inclination sensor (40) provided on the vehicle is greater than a threshold value, the rear wheel steering control unit prohibits a steering of the rear wheels and keeps the rear wheel brake engaged even if the steering input is determined.

5 Claims, 7 Drawing Sheets

SELECTIVE BRAKING OF FOUR WHEEL STEERING VEHICLE

TECHNICAL FIELD

Figure 1:
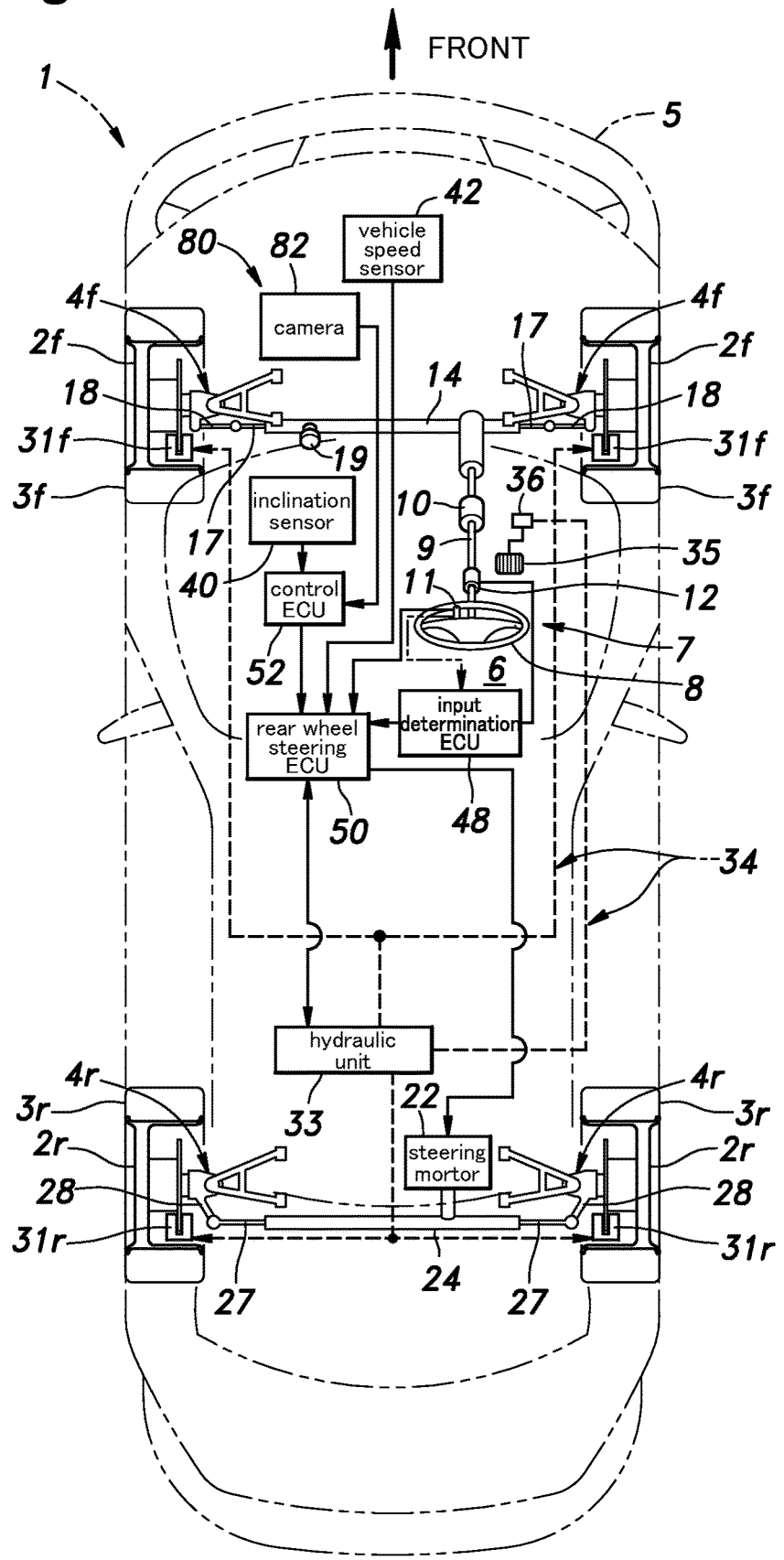

The present invention relates to a four wheel steering vehicle having front wheels and rear wheels that are steerable.

BACKGROUND ART

Four wheel steering vehicles having front wheels and rear wheels that are steerable are known. In the four wheel steering vehicle disclosed in JPH01-101979U, when the vehicle speed is equal to or less than a prescribed value, the front wheel steering angle is equal to or greater than a prescribed value, and the parking brake is not engaged, the rear wheels are steered in an opposite phase relationship to the front wheels.

It is known that a large steering torque is required to steer the front wheels when the vehicle is stationary, and that the same is true with the rear wheels. In the case of rear wheels, since the ground contact point of each rear wheel is often significantly displaced from the rotational axis of the rear wheel (kingpin axis), a particularly large steering torque is required to steer the rear wheel against the frictional force acting between the rear wheel and the road surface.

Sometimes, the vehicle is required to be steered on a sloping road surface. In such a case, it may be necessary to steer the vehicle while depressing the brake pedal in order to prevent the vehicle from rolling downhill on the sloping road surface. However, in such a case, a particularly great steering torque is required to steer the vehicle.

BRIEF SUMMARY OF THE INVENTION

In view of such a problem of the prior art, a primary object of the present invention is to provide a four wheel steering vehicle which can be steered without requiring any unduly great steering torque even when a braking force is being applied to the vehicle.

Another object of the present invention is to provide a four wheel steering vehicle that can be steered without requiring any unduly great steering torque even when the vehicle is kept stationary by braking on a sloping road surface.

To achieve such an object, one embodiment of the present invention provides a four wheel steering vehicle (1) in which front wheels (2˹) and rear wheels (2r) can be steered in response to a steering input from a steering member (8), comprising: an input determination unit (48) that determines a steering input to the steering member; a front wheel brake (31˹) that selectively applies a braking force to the front wheels; a rear wheel brake (31r) that selectively applies a braking force to the rear wheels; a front wheel steering device (7, 14, 19) that steers the front wheels according to the steering input; a rear wheel steering device (22, 24) that steers the rear wheels; and a rear wheel steering control unit (50) that variably controls the rear wheel steering device such that the rear wheels are steered in a prescribed relation to a steered angle of the front wheels; wherein when the steering input is determined while the front wheel brake and the rear wheel brake are engaged, the rear wheel steering control unit disengages the rear wheel brake and steers the rear wheels.

By disengaging the rear wheel brake, the rear wheels can be steered without requiring any unduly great steering torque, and the braking force applied to the front wheels prevents the vehicle from rolling downhill on the road surface.

Preferably, the four wheel steering vehicle further comprises an inclination sensor (40) that detects a fore and aft inclination angle of a road surface, wherein when the fore and aft inclination angle detected by the inclination sensor is greater than a threshold value and the steering input is determined while the front wheel brake and the rear wheel brake are engaged, the rear wheel steering control unit prohibits a steering of the rear wheels and keeps the rear wheel brake engaged.

Thereby, when the road surface is highly steep, the rear wheel brake is kept engaged even when the driver performs a steering operation, whereby the vehicle is prevented from rolling downhill on the sloping road surface owing to the combined braking force of the front wheel brake and the rear wheel brake.

Preferably, the four wheel steering vehicle further comprises a steering torque sensor (12) configured to detect a steering torque applied to the steering member, wherein the input determination unit determines the steering input from the steering torque detected by the steering torque sensor.

Thereby, the steering input can be determined in a reliable manner.

Preferably, the four wheel steering vehicle further comprises a steering angle sensor (11) configured to detect a steering angle of the steering member, wherein the input determination unit determines the steering input from the steering angle detected by the steering angle sensor.

Thereby, the steering input can be determined in a highly simple manner.

Preferably, when the steering input is determined while the front wheel brake and the rear wheel brake are engaged, the rear wheel steering control unit disengages the rear wheel brake in an intermittent manner.

Thereby, the steering torque required to steer the rear wheels can be reduced while the rear wheel brake effectively contributes to the effort to keep the vehicle stationary even on a sloping road surface in cooperation with the front wheel brake.

Preferably, the four wheel steering vehicle further comprises a friction estimation unit (80, 82) configured to estimate a frictional coefficient between the road surface and the front wheels and/or the rear wheels, wherein the rear wheel steering control unit decreases the threshold value of the fore and aft inclination angle with a decrease in the estimated frictional coefficient.

Thereby, when it is estimated that the frictional coefficient between the road surface and the front wheels and/or the rear wheels is small and hence a sufficient frictional force cannot be obtained between the road surface and the front wheels and/or the rear wheels, the rear wheel steering control unit keeps the rear brake engaged even if the steering input is determined (or the driver performs a steering operation), and therefore, the vehicle is prevented from inadvertently moving on a sloped road surface.

Preferably, the four wheel steering vehicle further comprises a steering torque sensor (12) configured to detect a steering torque applied to the steering member, and a steering angle sensor (11) configured to detect a steering angle of the steering member, wherein the friction estimation unit (80) is configured to estimate the frictional coefficient between the road surface and the front wheels and/or the rear wheels according to a relationship between the steering torque detected by the steering torque sensor and the steering angle detected by the steering angle sensor.

Thereby, the frictional coefficient between the road surface and the front wheels and/or the rear wheels can be estimated without requiring a special sensor for detecting the actual condition of the road surface, and associated electronic components.

The present invention thus provides a four wheel steering vehicle which can be steered without requiring any unduly great steering torque even when a braking force is being applied to the vehicle.

BRIEF DESCRIPTION OF THE DRAWING(S)

Figure 2:
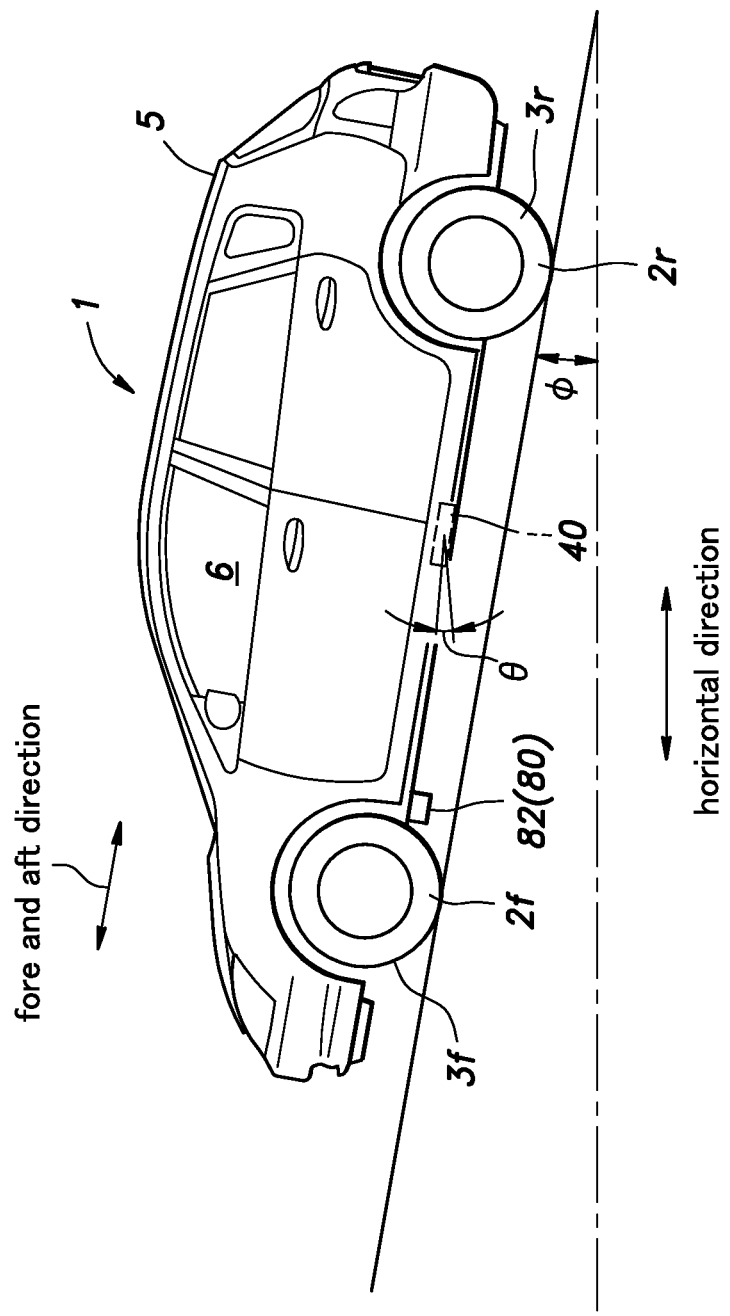
Figure 3:
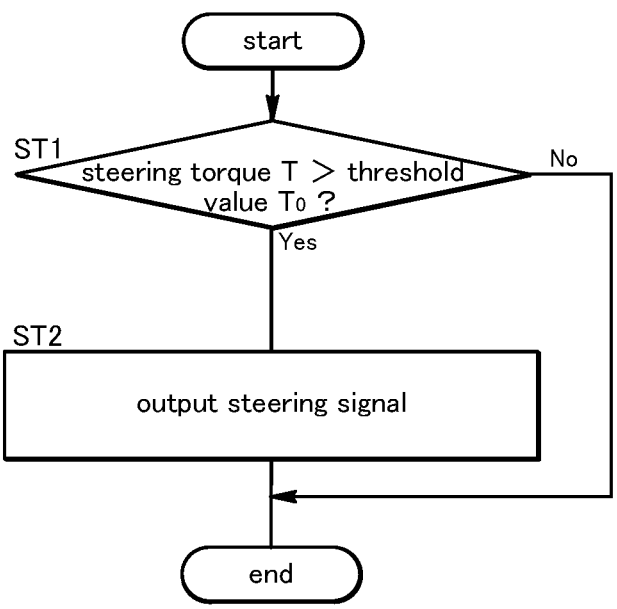
Figure 4:
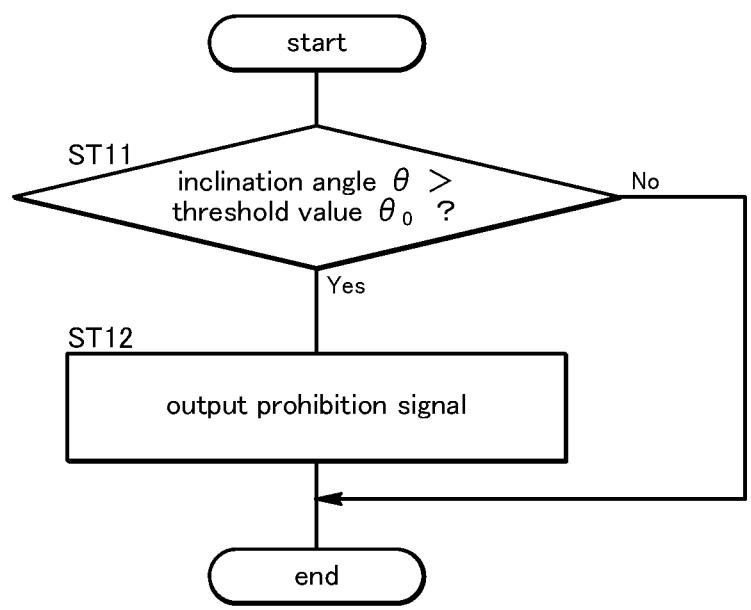
Figure 5:
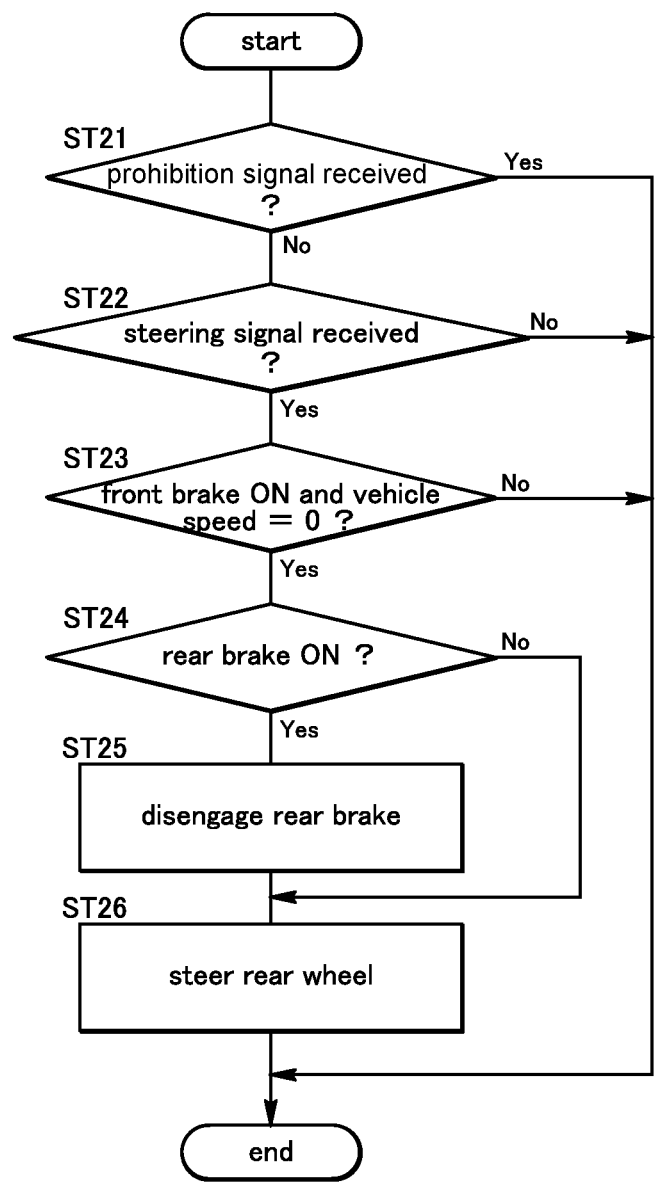
Figure 6B:
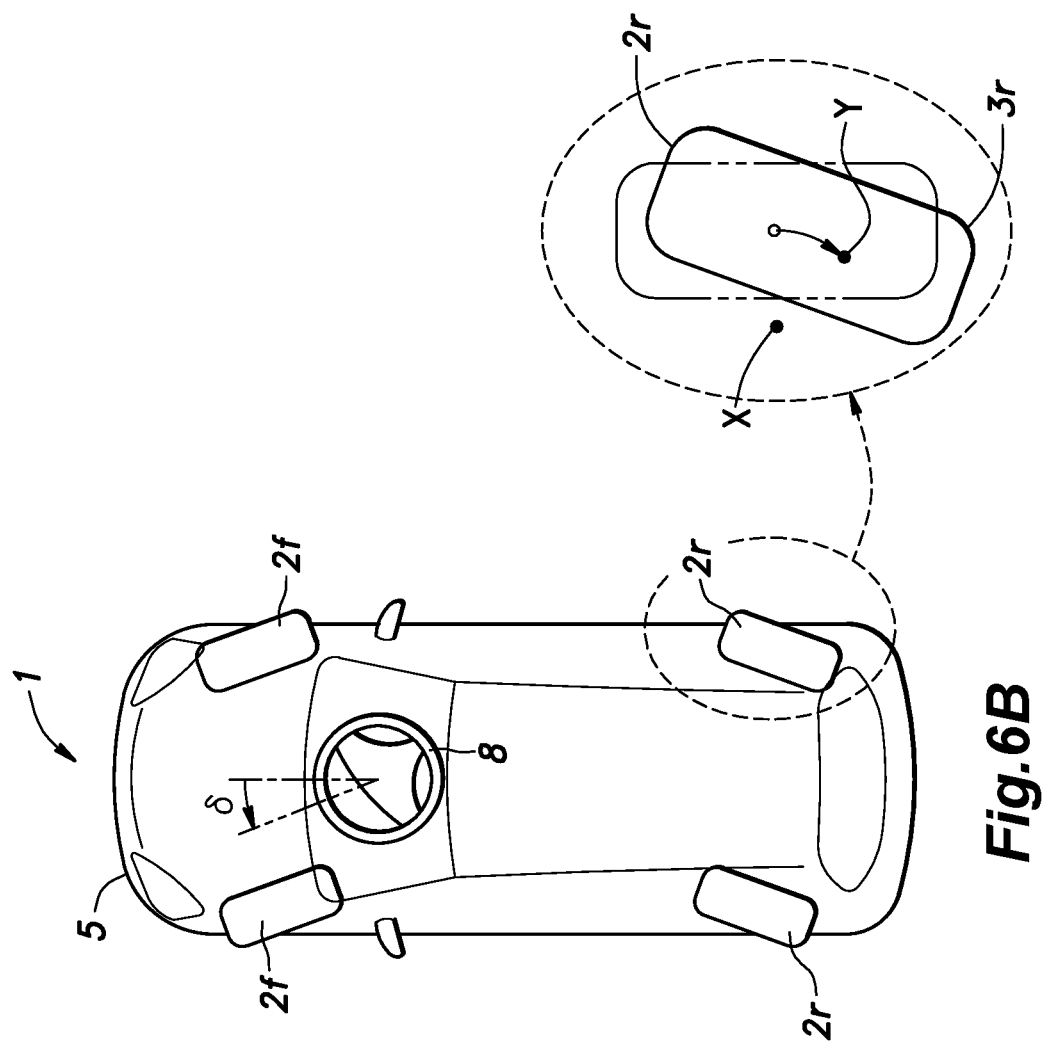
Figure 6A:
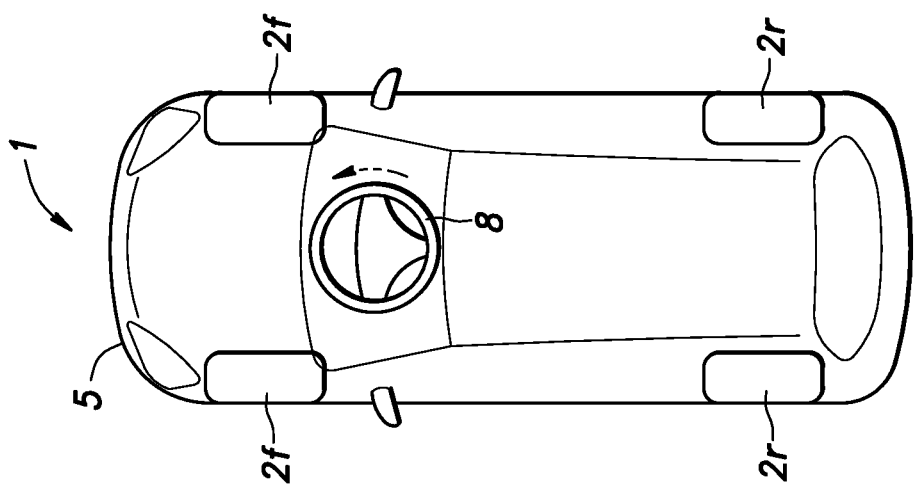
Figure 7B:
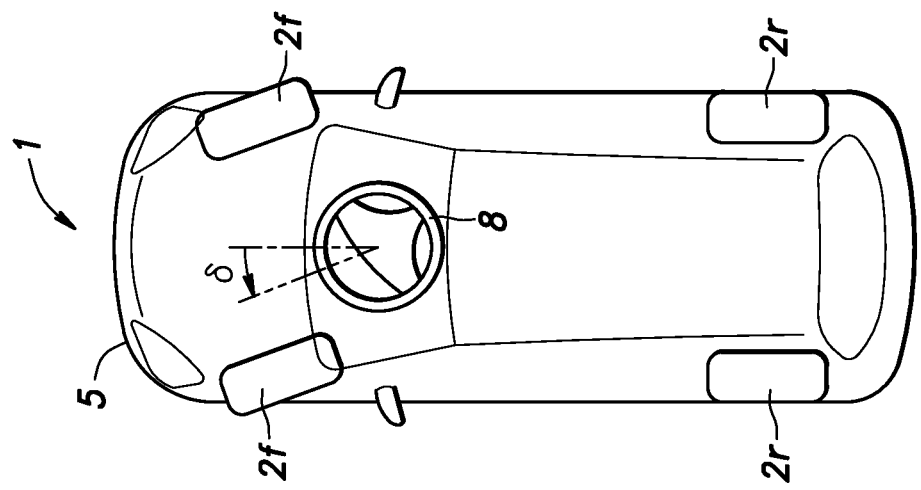
Figure 7A:
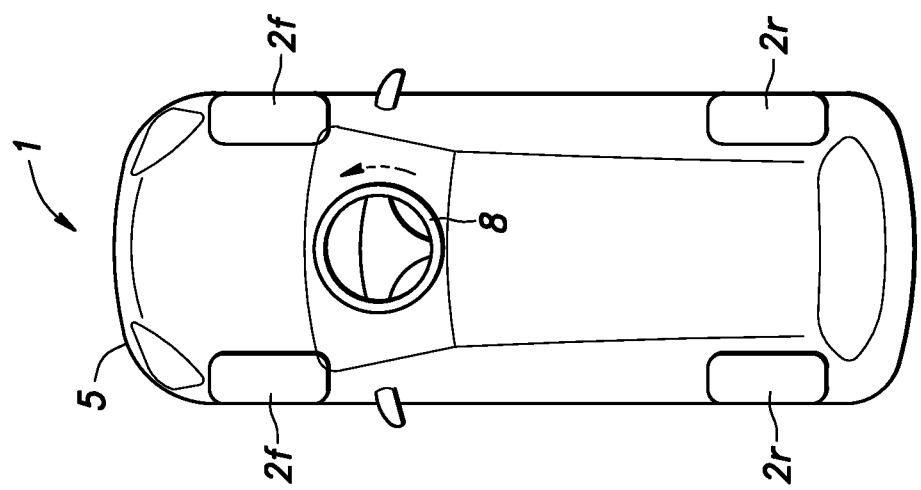

FIG. 1 is a schematic plan view showing a four wheel steering vehicle according to an embodiment of the present invention;
FIG. 2 is a schematic side view showing a fore and aft inclination angle of the road surface;
FIG. 3 is a flowchart of an input determination process;
FIG. 4 is a flowchart of an attitude determination process;
FIG. 5 is a flowchart of a rear wheel steering process;
FIGS. 6A and 6B are diagrams illustrating a steering operation of the vehicle on a relatively flat road surface; and
FIGS. 7A and 7B are diagrams illustrating the steering operation of the vehicle on a steeply inclined road surface.

DESCRIPTION OF THE PREFERRED EMBODIMENT(S)

A four wheel steering device according to a preferred embodiment of the present invention is described in the following with reference to the appended drawings. In the following description, some of the numerals are accompanied by suffixes such as r and f to indicate that the particular component is associated with a front wheel or a rear wheel. These suffixes are omitted when the particular component is referred to collectively.

As shown in FIG. 1, the four wheel steering vehicle 1 is provided with a pair of front wheels 2f and a pair of rear wheels 2r, and each wheel 2 is fitted with a tire 3. The front wheel 2f and the rear wheel 2r are supported by a vehicle body 5 via per se known suspension devices 4, respectively. The vehicle body 5 centrally defines a cabin 6 for accommodating occupants therein. The cabin 6 is provided with a driver's seat, and a steering device 7 is provided in a front part of the cabin 6 for steering the front wheels 2f.

The steering device 7 includes a steering wheel 8 (steering member) positioned in front of the driver's seat, and a steering shaft 9 extends forward integrally from the steering wheel 8 and is rotatably supported by the vehicle body 5 via a steering column 10. The steering shaft 9 is provided with a steering angle sensor 11 that detects a rotational angle (a steering angle δ) of the steering wheel 8, and a steering torque sensor 12 that detects a steering torque T applied from the steering wheel 8 to the steering shaft 9. The steering angle sensor 11 may be a Hall sensor that detects a magnetic field generated by a magnet attached to the outer periphery of the steering shaft 9.

The lower end of the steering shaft 9 is connected to a front gear box 14 which includes a pinion that rotates fast with the steering shaft 9, and a laterally extending rack that meshes with the pinion. Each lateral end of the rack is pivotally connected to a knuckle arm 18 via a tie rod 17, and the knuckle arm 18 is integrally connected to the corresponding front wheel 2f.

As the steering wheel 8 is turned by the driver, the rack moves laterally by a stroke corresponding to the steering angle δ of the steering wheel 8. The front wheels 2f are steered by a steered angle corresponding to the lateral stroke of the rack. The front gear box 14 is further provided with a power assist motor 19 connected to the rack of the front gear box 14 via a gear mechanism. When the driver turns the steering wheel 8, the steering torque T applied to the steering shaft 9 from the driver is detected by the steering torque sensor 12. The power assist motor 19 is connected to the steering torque sensor 12, and is configured to apply a thrust force to the rack according to the steering torque T detected by the steering torque sensor 12 such that the driver is assisted in steering the front wheels 2f.

A steering motor 22 for steering the rear wheels 2r is provided in a rear part of the vehicle body 5. The output shaft of the steering motor 22 is connected to the rear gear box 24. The rear gear box 24 includes a pinion that is rotatively driven by the output shaft, and a laterally extending rack that meshes with the pinion. A knuckle arm 28 is connected to each lateral end of the rack via a tie rod 27, and the knuckle arm 28 is connected to the corresponding rear wheel 2r.

When the steering motor 22 is driven, the rack moves laterally by a stroke corresponding to the rotational angle of the output shaft. The rear wheels 2r are steered to the right or left depending on the direction and the stroke of the rack (see FIG. 6B, for example). The steered angle of the rear wheels 2r is determined in a prescribed relationship to the steered angle of the front wheels 2f. The relationship between the steered angles of the front wheels 2f and the rear wheels 2r may depend on the traveling speed of the vehicle and the steering angle of the steering wheel 8 in a per se known manner. As shown in the enlarged view of the part surrounded by the broken line in FIG. 6B, the rotational axis (kingpin axis X) of each rear wheel 2r is typically offset from the ground contact point Y of the rear wheel 2r by a certain distance.

As shown in FIG. 1, the front wheels 2f and the rear wheels 2r are provided with hydraulic brakes 31 (disc brake calipers), respectively. Each brake 31 includes a cylinder and a piston (not shown) received in the cylinder so as to function as a power actuator. Oil pressure is selectively supplied from a hydraulic circuit 34 to each cylinder to apply a corresponding oil pressure to the piston, and this oil pressure is converted into a brake force that is applied to the corresponding wheel 2 in a per se known manner.

A brake pedal 35 is provided in front of the driver's seat, and a brake master cylinder 36 is connected to the brake pedal 35. When the brake pedal 35 is depressed by the driver, the oil pressure produced in the brake master cylinder 36 is transmitted to the hydraulic circuit 34 to be distributed to the brakes 31 of the respective wheels 2. A hydraulic unit 33 provided in the hydraulic circuit 34 controls the distribution of the oil pressure to the cylinders of the brakes 31. In particular, the hydraulic circuit 34 is provided with solenoid valves so that the oil pressure supplied to the different brakes 31 can be individually varied by controlling the solenoid valves. Also, the hydraulic unit 33 is configured to produce electric signals corresponding to the oil pressure supplied to the respective brakes 31 as electric signals.

Thus, the hydraulic unit 33 is able to disengage the brakes of the rear wheels 2r either continuously or intermittently even when the brake pedal 35 is depressed according to a control command which will be described hereinafter. During the normal operation, the hydraulic unit 33 controls the oil pressure supplied to the right and left front wheels 2f to be equal to each other, and the oil pressure supplied to the right and right rear wheels 2r to be equal to each other. The hydraulic unit 33 may also be provided with VSA (vehicle stability assist) functions by suitably distributing the brake force to the different wheels.

As shown in FIG. 2, the vehicle body 5 is provided with an inclination angle sensor 40 that detects an inclination angle θ of the vehicle 1 with respect to a horizontal plane in the fore and aft direction. The inclination angle θ corresponds to the pitch angle of the four wheel steering vehicle 1. The inclination angle in the downhill direction is defined as positive, and the inclination angle in the uphill direction is defined as negative. However, for the purpose of the present invention, the absolute value of the inclination angle (which may be referred to as inclination angle θ) may be used without making any distinction in regards to the direction of the inclination.

As shown in FIG. 2, the inclination angle of the four wheel steering vehicle 1 coincides with the inclination angle φ (=θ) of the road surface. The inclination angle sensor 40 may consist of any per se known inclination angle sensors such as the MEMS (microelectromechanical system) device whose capacitance changes with the inclination angle of the device, a spirit level sensor and so on.

As shown in FIG. 1, the vehicle body 5 is provided with a per se known vehicle speed sensor 42 that detects the traveling speed of the vehicle 1 relative to the road surface. The vehicle speed sensor 42 may be based on the rotational speed of the wheels 2, or may detect the speed of the vehicle 1 with respect to the road surface.

The vehicle body 5 is provided with an input determination ECU 48 (input determination unit) that determines a steering input or an intent to steer the vehicle according a steering torque T detected by the steering torque sensor 12, a rear wheel steering ECU 50 (rear wheel steering control unit) that performs the steering operation according to an output from the input determination ECU 48, and a control ECU 52 (control unit) that controls the rear wheel steering ECU 50. Each of the input determination ECU 48, the rear wheel steering ECU 50, and the control ECU 52 includes a microcomputer, ROM, RAM, a peripheral circuit, an input/output interface, and various drivers.

Alternatively, the steering input may be determined from the steering angle detected by the steering angle sensor 11. In particular, the presence or absence of a steering input from the driver may be determined based on the change rate in the steering angle δ detected by the steering angle sensor 11.

The input determination ECU 48 is connected to the steering torque sensor 12 and the rear wheel steering ECU 50. While the electric power is supplied from the vehicle 1, and the vehicle 1 is in operation, the input determination ECU 48 performs an input determination process for determining the presence or absence of the steering input based on the steering torque T detected by the steering torque sensor 12. The details of the input determination process will be described in detail in the following with reference to FIG. 3.

In step ST1, the input determination ECU 48 determines if the detected steering torque T is equal to or greater than a predetermined threshold value (torque threshold value T0). When the steering torque T is equal to or greater than the torque threshold value T0, it is determined that there is a steering input, and the program flow advances to step ST2. When the steering torque T is smaller than the torque threshold value T0, it is determined that there is no steering input, and the input determination process is terminated. The torque threshold value T0 may be determined based on the minimum steering torque T that would be applied to the steering wheel 8 when the driver intends to steer the vehicle.

In step ST2, the input determination ECU 48 outputs a signal (steering signal) indicating the presence of the steering input to the rear wheel steering ECU 50. Then, the input determination process ends, and the program flow returns to the main routine.

As shown in FIG. 1, the control ECU 52 is connected to the inclination angle sensor 40 and the rear wheel steering ECU 50. In the present embodiment, an attitude determination process is executed to determine the inclination angle of the vehicle 1. If the detected inclination angle is so steep that not only the front wheel brakes 31f but also the rear wheel brakes 31r are required to be engaged to keep the vehicle 1 stationary, the rear wheel steering ECU 50 prohibits the steering of the rear wheels 2r. FIG. 4 shows the details of the attitude determination process.

In the attitude determination process, the control ECU 52 acquires the fore and aft direction inclination angle θ from the inclination angle sensor 40 in step ST11. When the fore and aft inclination angle θ is greater than the predetermined inclination angle threshold value θ0, step ST12 is executed. Otherwise, the attitude determination process is concluded.

In step ST12, the control ECU 52 outputs a signal (prohibition signal) for prohibiting the steering of the rear wheels 2r, and then terminates the attitude determination process.

As shown in FIG. 1, the rear wheel steering ECU 50 is connected to the hydraulic unit 33, the steering angle sensor 11, the steering motor 22, the vehicle speed sensor 42, the input determination ECU 48, and the control ECU 52. When the rear wheels 2r are steered by the steering motor 22, the rear wheel steering ECU 50 performs a rear wheel steering process. The details of the rear wheel steering process will be described in the following with reference to FIG. 5.

In the rear wheel steering process, first of all, the rear wheel steering ECU 50 determines in step ST21 if the prohibition signal that prohibits the steering of the rear wheels 2r is received from the control ECU 52. If the prohibition signal is received, the rear wheel steering process is concluded. Otherwise, the program flow advances to ST22.

In step ST22, the rear wheel steering ECU 50 determines if a signal indicating the presence of a steering input or the steering signal is received from the input determination ECU 48. If the steering signal is received, step ST23 is executed. Otherwise, the rear wheel steering process is concluded.

In step ST23, the rear wheel steering ECU 50 acquires the brake pressure of the front wheel brakes 31f from the hydraulic unit 33, and acquires the vehicle speed from the vehicle speed sensor 42. When the brake pressure of the front wheel brakes 31f is detected, and the vehicle speed is 0, or in other words, when the front wheel brakes 31f are engaged and the vehicle speed is 0, step ST24 is executed. Otherwise, the rear wheel steering process is terminated. Alternatively, if the oil pressure of the front wheel brakes 31f is greater than a prescribed threshold value and the vehicle speed is 0 in step ST23, the rear wheel steering ECU 50 may execute step ST24, and otherwise conclude the rear wheel steering process.

The rear wheel steering ECU 50 acquires the brake pressure of the rear wheel brakes 31r from the hydraulic unit 33 in step ST24. When the brake pressure of the rear wheel brakes 31r is detected, or when the rear wheel brakes 31r are engaged, step ST25 is executed, and otherwise, step ST26 is executed.

In step ST25, the rear wheel steering ECU 50 forwards a signal to the hydraulic unit 33 so that the brake pressure of the rear wheel brakes 31r is reduced to zero. As a result, the rear wheel brakes 31r are disengaged, and the braking force of the rear wheels 2r becomes zero. Thereafter, the rear wheel steering ECU 50 executes step ST26 to the steer the rear wheels 2r as commanded.

In step ST26, the rear wheel steering ECU 50 acquires the steering angle δ from the steering angle sensor 11, and drives the steering motor 22 according to the steering angle δ. Typically, the steering motor 22 is driven so that the steering angle of the rear wheel 2r is opposite in phase to the steering angle δ of the steering wheel 8. When step ST26 is completed, the rear wheel steering ECU 50 concludes the rear wheel steering process.

The mode of operation of the four wheel steering vehicle 1 configured as described above will be described in the following. When the driver depresses the brake pedal 35 and stops the vehicle, the front wheel brakes 31f and the rear wheel brakes 31r are engaged, and the four wheel steering vehicle 1 comes to a stop. FIGS. 6A and 6B show a case where the four wheel steering vehicle 1 is stationary on the road surface where the inclination angle φ as measured in the fore and aft direction is equal to or less than the inclination angle threshold θ0. In the illustrated embodiment, the inclination angle φ of the road surface is determined from the inclination angle θ of the vehicle body 5 with respect to the horizontal plane.

In the four wheel steering vehicle 1 shown in FIG. 6A, when the driver tries to turn the steering wheel 8 while applying a brake or depressing the brake pedal 35, a steering torque T equal to or greater than the torque threshold value T0 is applied to the steering shaft 9. At this time, since the fore and aft inclination angle θ is equal to or smaller than the inclination angle threshold θ0, the control ECU 52 does not output a signal for prohibiting the steering of the rear wheels 2r (step ST11). Further, since the steering torque T is equal to or greater than the torque threshold value T0, the input determination ECU 48 determines that there is a steering input (step ST1). Thus, the rear wheel steering ECU 50 disengages the rear wheel brakes 31r (step ST25), drives the steering motor 22, and steers the rear wheels 2r. As a result, not only the front wheels 2f but also the rear wheels 2r of the four wheel steering vehicle 1 are steered (FIG. 6B).

In the four wheel steering vehicle 1 in which the kingpin axis X of each rear wheel 2r and the ground contact point Y are separated from each other by a certain distance, a significant amount of steering torque is required to steer the rear wheel 2r particularly when the brake is engaged. However, when the brake is disengaged, the required steering torque decreases significantly. The enlarged view in FIG. 6B illustrates the reason for this. Therefore, if the steering motor 22 is limited in power, the steering motor 22 may not be able to provide an adequate steering torque that is required to overcome the frictional force between the tires 3r of the rear wheels 2r and the road surface. Typically, the steering motor 22 is relative small in size and capacity to minimize the increase in the weight of the vehicle. Also, in view of avoiding excessive power consumption, it is a common practice to limit the electric power supplied to the steering motor 22 for the rear wheels 2r. Furthermore, steering the rear wheels 2r while the brakes are engaged causes stress to the steering mechanism, and adds to the wear of the tires 3r.

In order to overcome this problem, in the present invention, the rear wheel steering ECU 50 disengages the rear wheel brakes 31r in step ST25, and then steers the rear wheels 2r in step ST26. Since the rear wheels 2r are allowed to freely rotate when the rear wheels 2r are steered, the steering torque required to be applied by the steering motor 22 is decreased as compared to the case where the rear wheels 2r are steered without releasing the rear wheel brakes 31r. Therefore, compared to the case where the rear wheels 2r are steered without releasing the rear wheel brakes 31r, the steering motor 22 can be made smaller in size and lighter in weight, and the wear of the tires 3r of the rear wheels 2r can be reduced.

FIG. 7 shows a case where the four wheel steering vehicle 1 is stationary on a road surface whose inclination angle in the fore and aft direction is greater than the inclination angle threshold θ0. If the road surface inclination angle φ is greater than the inclination angle threshold value θ0, the frictional force between the road surface and the tires 3f of the front wheels 2f alone may not be adequate to keep the vehicle 1 stationary on the road surface. In such a case, there is a risk that the vehicle may roll down the sloped road surface against the will of the driver. In the present embodiment, as shown in FIG. 4, when the fore and aft direction inclination angle θ is greater than the inclination angle threshold value θ0, or in other words, when the road surface inclination angle φ is greater than the inclination angle threshold value θ0, the control ECU 52 outputs a signal that prohibits the steering of the rear wheels 2r (step ST12). As a result, as shown in FIG. 5, the rear wheel steering ECU 50 does not steer the rear wheels 2r (step ST21), and does not disengage the rear wheel brakes 31r. Therefore, when the road inclination angle φ is greater than the inclination angle threshold θ0, even if the driver operates the steering wheel 8 (FIG. 7A), the rear wheel steering process is not performed, and only the front wheels 2f are turned. Thus, the rear wheels 2r are not steered (FIG. 7B). Also, the brakes of the rear wheels 2r are not disengaged. Thus, the steering motor 22 is prevented from being excessively loaded, and the vehicle is prevented from inadvertently rolling downhill on the road surface.

The present invention has been described in terms of a specific embodiment, but is not limited by such an embodiment, and can be modified in various ways without departing from the spirit of the present invention. In the above embodiment, the rear wheel steering ECU 50 was configured to execute step ST24 when the brake pressure of the front wheel brakes 31f is detected (or more than a predetermined threshold) and the vehicle speed is 0 in step ST23. However, it is also possible to arrange such that the rear wheel steering ECU 50 executes step ST24 when the brake pressure of the front wheel brakes 31f is detected (or more than a predetermined threshold) and the vehicle speed is smaller than a prescribed threshold value in step ST23.

In the above embodiment, the input determination ECU 48 determined the presence or absence of a steering input from the driver based on the steering torque T, but the present invention is not limited to this embodiment. For example, the input determination ECU 48 may be connected to the steering angle sensor 11, and determine the presence or absence of a steering input from the driver based on the change rate in the steering angle δ detected by the steering angle sensor 11. More specifically, the input determination ECU 48 may determine that there is a steering input from the driver when the change in the steering angle δ in a prescribed time period is equal to or greater than a predetermined threshold.

The rear wheel steering ECU 50 disengaged the rear wheel brakes 31r in step ST25 and steered the rear wheels 2r in step ST26 in the foregoing embodiment. However, the present invention is not limited to this embodiment. For example, the rear wheel steering ECU 50 may steer the rear wheel 2r while intermittently releasing the rear wheel brakes 31r in steps ST25 and ST26. Thereby, the load on the steering motor 22 can be reduced while the vehicle is prevented from rolling downhill on the road surface.

Further, in the foregoing embodiment, when the detected inclination angle of the road surface is greater than the inclination angle threshold value, the steering of the rear wheels 2r was prohibited, and the brakes for the rear wheels are kept engaged. However, it is also possible to arrange such that when the detected inclination angle of the road surface is greater than the inclination angle threshold value, the steering of the rear wheels 2r is permitted while the brakes for the rear wheels 2r are kept engaged.

The four wheel steering vehicle 1 may be provided with a frictional coefficient estimation unit 80 (see FIGS. 1 and 2) that estimates the frictional coefficient $\mu$ between the road surface and the tires 3f of the front wheels 2f (and/or the tires 3r of the rear wheels 2r), and the control ECU 52 may be configured to determine or vary the inclination angle threshold value $\theta0$ according to the estimated frictional coefficient $\mu$. The inclination angle threshold value $\theta0$ may be increased (decreased) with an increase (a decrease) in the frictional coefficient $\mu$.

The frictional coefficient estimation unit 80 is provided in a lower part of the vehicle body 5, and includes a camera for imaging the road surface (hereinafter, road surface camera 82). The frictional coefficient estimation unit 80 estimates the frictional coefficient $\mu$ between the tires 3f of the front wheels 2f and the road surface according to the image captured by the road surface camera 82.

Alternatively, the frictional coefficient estimation unit 80 may be connected to the steering angle sensor 11 and the steering torque sensor 12. According to this arrangement, the frictional coefficient $\mu$ between the road surface and the tires 3f of the front wheels 2f can be estimated from the relationship between the steering angle $\delta$ detected by the steering angle sensor 11 (or the steered angle of the front wheels 20 and the steering torque T detected by the steering torque sensor 12. More specifically, the frictional coefficient estimation unit 80 computes the frictional force applied to the front wheels 2f according to the relationship between the steering torque T, which is an external force applied to the front wheel 2f, and the steering angle $\delta$ corresponding to the rotational angle of the front wheels 2f caused by this external force. Accordingly, the frictional coefficient $\mu$ between the front wheels 2f (and/or the tires 3r of the rear wheels 2r) and the road surface can be obtained without requiring any sensor for detecting the state of the road surface such as a camera.

When the rear wheel steering ECU 50 steers the rear wheels 2r while intermittently releasing the rear wheel brakes 31r in step ST26, the duty ratio in activating the rear wheel brakes may be varied depending on the estimated frictional coefficient $\mu$. For instance, the rear wheel steering ECU 50 may be configured to increase the duty ratio of engaging the rear wheel brakes 31r with a decrease in the frictional coefficient $\mu$.

Further, when the rear wheel steering ECU 50 disengages the rear wheel brakes 31r, the hydraulic unit 33 may be controlled so as to increase the brake pressure applied to the front wheel brakes 31f in step ST25. Thereby, when the rear wheel brakes 31r of the rear wheels 2r is disengaged, the likelihood of the vehicle rolling downhill on the road surface can be reduced.

When the suspension devices 4 for the front wheels 2f and the rear wheels 2r are configured to be extended and retracted by using a suitable power source such as oil pressure, it is possible to tilt the vehicle body in the fore and aft direction for good purpose. For instance, when the rear wheel brakes 31r are disengaged by the rear wheel steering ECU 50 in step ST25, the rear wheel steering ECU 50 may extend the suspension devices 4r for the rear wheels 2r (and/or retract the suspension devices 4f for the front wheels 20 to shift the gravitational center of the vehicle 1 forward so that the reaction force which the front wheels 2f receive from the road surface may be increased. As a result, the static frictional force acting between the front wheels 2f and the road surface can be increased, and this helps to prevent the inadvertent movement of the vehicle 1 on a slope.

The invention claimed is:

1. A four wheel steering vehicle in which front wheels and rear wheels can be steered in response to a steering input from a steering member, comprising:
    an input determination unit that determines a steering input to the steering member;
    a front wheel brake that selectively applies a braking force to the front wheels;
    a rear wheel brake that selectively applies a braking force to the rear wheels;
    a front wheel steering device that steers the front wheels according to the steering input;
    a rear wheel steering device that steers the rear wheels;
    a rear wheel steering control unit that variably controls the rear wheel steering device such that the rear wheels are steered in a prescribed relation to a steered angle of the front wheels;
    an inclination sensor that detects a fore and aft inclination angle of a road surface; and
    a friction estimation unit configured to estimate a frictional coefficient between the road surface and the front wheels and/or the rear wheels;
    wherein when the steering input is determined while the front wheel brake and the rear wheel brake are engaged, the rear wheel steering control unit disengages the rear wheel brake and steers the rear wheels,
    wherein when the fore and aft inclination angle detected by the inclination sensor is greater than a threshold value and the steering input is determined while the front wheel brake and the rear wheel brake are engaged, the rear wheel steering control unit prohibits a steering of the rear wheels and keeps the rear wheel brake engaged, and
    wherein the rear wheel steering control unit decreases the threshold value of the fore and aft inclination angle with a decrease in the estimated frictional coefficient.

2. The four wheel steering vehicle according to claim 1, further comprising a steering torque sensor configured to detect a steering torque applied to the steering member, and a steering angle sensor configured to detect a steering angle of the steering member,
    wherein the friction estimation unit is configured to estimate the frictional coefficient between the road surface and the front wheels and/or the rear wheels according to a relationship between the steering torque detected by the steering torque sensor and the steering angle detected by the steering angle sensor.

3. The four wheel steering vehicle according to claim 1, further comprising a steering torque sensor configured to detect a steering torque applied to the steering member, wherein the input determination unit determines the steering input from the steering torque detected by the steering torque sensor.

4. The four wheel steering vehicle according to claim 1, further comprising a steering angle sensor configured to detect a steering angle of the steering member, wherein the input determination unit determines the steering input from the steering angle detected by the steering angle sensor.

5. The four wheel steering vehicle according to claim 1, wherein when the steering input is determined while the front wheel brake and the rear wheel brake are engaged, the rear wheel steering control unit disengages the rear wheel brake in an intermittent manner.

* * * * *